US012327502B1

(12) United States Patent
Chen

(10) Patent No.: US 12,327,502 B1
(45) Date of Patent: Jun. 10, 2025

(54) DRIVER DEVICE HAVING OUTPUT CONTROL MODULE CONNECTED BETWEEN A PLURALITY OF DATA DRIVER CHIPS AND DISPLAY DEVICE INCLUDING THE SAME

(71) Applicant: TCL CHINA STAR OPTOELECTRONICS TECHNOLOGY CO., LTD., Shenzhen (CN)

(72) Inventor: Weifeng Chen, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/401,528

(22) Filed: Dec. 31, 2023

(30) Foreign Application Priority Data

Nov. 27, 2023 (CN) ........................ 202311604057.8

(51) Int. Cl.
*G09G 3/00* (2006.01)
*G09G 3/20* (2006.01)

(52) U.S. Cl.
CPC ........... *G09G 3/006* (2013.01); *G09G 3/2096* (2013.01); *G09G 2310/027* (2013.01)

(58) Field of Classification Search
CPC ...................................................... G09G 3/006
USPC .......................................................... 345/204
See application file for complete search history.

(56) References Cited

U.S. PATENT DOCUMENTS

2006/0256063 A1* 11/2006 An ....................... G09G 3/3688 345/98
2009/0021507 A1* 1/2009 Bae ...................... G09G 3/3696 345/212
2015/0339995 A1* 11/2015 Igawa ................. G09G 3/3688 345/206

* cited by examiner

*Primary Examiner* — Long D Pham
(74) *Attorney, Agent, or Firm* — The Roy Gross Law Firm, LLC; Roy D. Gross

(57) ABSTRACT

A driver device includes a first data driver chip, a second data driver chip, and a first output control module. The first data driver chip includes a plurality of first data transmission paths. The second data driver chip is disposed adjacent to the first data driver chip. The second data driver chip includes a plurality of second data transmission paths. The first output control module is connected with the m-th first data transmission path and the n-th second data transmission path. The first output control module is configured to conduct an output end of the m-th first data transmission path with an output end of the n-th second data transmission path when an input voltage of the m-th first data transmission path is same as an input voltage of the n-th second data transmission path, where m and n are positive integers.

20 Claims, 7 Drawing Sheets

DRIVER DEVICE HAVING OUTPUT CONTROL MODULE CONNECTED BETWEEN A PLURALITY OF DATA DRIVER CHIPS AND DISPLAY DEVICE INCLUDING THE SAME

CROSS REFERENCE TO RELATED APPLICATION

This application claims priority to Chinese Application No. 202311604057.8, filed on Nov. 27, 2023. The entire disclosure of the above application is incorporated herein by reference.

FIELD OF INVENTION

The present disclosure relates to a field of drive technology, specifically to a driver device and a display device.

BACKGROUND

Pixel structures of display panels mainly comprise a 1G1D (one gate line and one data line) structure, a DLS (data line share) structure, and a tri-gate (three gate line and one data line) structure. A number of source driver chips in the DLS structure and a number of source driver chips in the tri-gate structure are less than half a number of source driver chips in the 1G1D structure. Therefore, a load driven by the source driver chips of the DLS structure and a load driven by the source driver chips of the tri-gate structure are larger than a load driven by the source driver chips of the 1G1D structure, especially the load driven by the source driver chips of the tri-gate structure is the largest. The load driven by the source driver chips may be too large, resulting in insufficient charging. A slight difference in load or output thrust will lead to a difference in charging, resulting in obvious split screens in a plane.

SUMMARY

The present disclosure provides a driver device and a display device, which can effectively solve a problem of split screens caused by a charging difference between two adjacent data driver chips.

The present disclosure provides a driver device. The driver device comprises a first data driver chip, a second data driver chip, and a first output control module. The first data driver chip comprises a plurality of first data transmission paths. The second data driver chip is disposed adjacent to the first data driver chip. The second data driver chip comprises a plurality of second data transmission paths. The first output control module is connected with the m-th first data transmission path and the n-th second data transmission path. The first output control module is configured to conduct an output end of the m-th first data transmission path with an output end of the n-th second data transmission path when an input voltage of the m-th first data transmission path is same as an input voltage of the n-th second data transmission path, where m and n are positive integers. The m-th first data transmission path is close to the second data driver chip, and/or the n-th second data transmission path is close to the first data driver chip.

In some embodiments of the present disclosure, the m-th first data transmission path and the n-th second data transmission path are two adjacent data transmission paths.

In some embodiments of the present disclosure, the m-th first data transmission path and the n-th second data transmission path are two adjacent odd-numbered or even-numbered data transmission paths.

In some embodiments of the present disclosure, a polarity of the input voltage of the m-th first data transmission path is same as a polarity of the input voltage of the n-th second data transmission path.

In some embodiments of the present disclosure, the first output control module comprises a first detection unit and a first control unit. The first detection unit is connected with an input end of the m-th first data transmission path and an input end of the n-th second data transmission path, and is configured to output a first detection signal when the input voltage of the m-th first data transmission path is the same as the input voltage of the n-th second data transmission path. The first control unit is connected with the output end of the m-th first data transmission path, the output end of the n-th second data transmission path, and the first detection unit, and is configured to conduct the output end of the m-th first data transmission path with the output end of the n-th second data transmission path according to the first detection signal.

In some embodiments of the present disclosure, the first detection unit comprises a first comparator, the first control unit comprises a first switching transistor, a non-inverting input end of the first comparator is connected with the input end of the m-th first data transmission path, an inverting input end of the first comparator is connected with the input end of the n-th second data transmission path, an output end of the first comparator is connected with a first end of the first switching transistor, a second end of the first switching transistor is connected with the output end of the m-th first data transmission path, and a third end of the first switching transistor is connected with the output end of the n-th second data transmission path.

In some embodiments of the present disclosure, the first data driver chip further comprises a second output control module connected with two of the first data transmission paths, and the second output control module is configured to conduct output ends of the two connected first data transmission paths when input voltages of the two connected first data transmission paths are same.

In some embodiments of the present disclosure, one of the two first data transmission paths connected by the second output control module is the m-th first data transmission path.

In some embodiments of the present disclosure, a number of the first data transmission paths in the first data driver chip is a, a is a positive integer greater than 2, a number of the second output control module is (a-2), every two first data transmission paths are connected to one second output control module, and the second output control module is configured to conduct the output ends of the two connected first data transmission paths when the input voltages of the two connected first data transmission paths are same.

In some embodiments of the present disclosure, the second output control module comprises a second detection unit and a second control unit. The second detection unit is connected with input ends of two of the first data transmission paths, and is configured to output a second detection signal when the input voltages of the two connected first data transmission paths are same. The second control unit is connected with the output ends of the two first data transmission paths connected by the second detection unit, is connected with the second detection unit, and is configured to control conduction of the output ends of the two first data transmission paths connected by the second detection unit according to the second detection signal.

In some embodiments of the present disclosure, the second detection unit comprises a second comparator, the second control unit comprises a second switching transistor, a non-inverting input end of the second comparator is connected with the input end of one of the first data transmission paths, an inverting input end of the second comparator is connected with the input end of another first data transmission path, an output end of the second comparator is connected with a first end of the second switching transistor, a second end of the second switching transistor is connected with the output end of the one of the first data transmission paths, and a third end of the second switching transistor is connected with the output end of the another first data transmission path.

In some embodiments of the present disclosure, the second data driver chip further comprises a third output control module connected with two of the second data transmission paths, and the third output control module is configured to conduct output ends of the two connected second data transmission paths when input voltages of the two connected second data transmission paths are same.

In some embodiments of the present disclosure, one of the two second data transmission paths connected by the third output control module is the n-th first data transmission path.

In some embodiments of the present disclosure, a number of the second data transmission paths in the second data driver chip is b, b is a positive integer greater than 2, a number of the third output control module is (b-2), every two second data transmission paths are connected to one third output control module, and the third output control module is configured to conduct the output ends of the two connected second data transmission paths when the input voltages of the two connected second data transmission paths are same.

In some embodiments of the present disclosure, the third output control module comprises a third detection unit and a third control unit. The third detection unit is connected with input ends of two of the second data transmission paths, and is configured to output a third detection signal when the input voltages of the two connected second data transmission paths are the same. The third control unit is connected with the output ends of the two second data transmission paths connected by the third detection unit, is connected with the third detection unit, and is configured to control conduction of the output ends of the two second data transmission paths connected by the third detection unit according to the third detection signal.

In some embodiments of the present disclosure, the third detection unit comprises a third comparator, the third control unit comprises a third switching transistor, a non-inverting input end of the third comparator is connected with the input end of one of the second data transmission paths, an inverting input end of the third comparator is connected with the input end of another second data transmission path, an output end of the third comparator is connected with a first end of the third switching transistor, a second end of the third switching transistor is connected with the output end of the one of the second data transmission paths, and a third end of the third switching transistor is connected with the output end of the another second data transmission path.

The present disclosure further provides a display device. The display device comprises a display panel and a driver device. The driver device is connected to the display panel. The driver device is configured to provide a data voltage to the display panel. The driver device comprises a first data driver chip, a second data driver chip, and a first output control module. The first data driver chip comprises a plurality of first data transmission paths. The second data driver chip is disposed adjacent to the first data driver chip. The second data driver chip comprises a plurality of second data transmission paths. The first output control module is connected with the m-th first data transmission path and the n-th second data transmission path. The first output control module is configured to conduct an output end of the m-th first data transmission path with an output end of the n-th second data transmission path when an input voltage of the m-th first data transmission path is same as an input voltage of the n-th second data transmission path, where m and n are positive integers. The m-th first data transmission path is close to the second data driver chip, and/or the n-th second data transmission path is close to the first data driver chip.

In some embodiments of the present disclosure, the first output control module comprises a first detection unit and a first control unit. The first detection unit is connected with an input end of the m-th first data transmission path and an input end of the n-th second data transmission path, and is configured to output a first detection signal when the input voltage of the m-th first data transmission path is the same as the input voltage of the n-th second data transmission path. The first control unit is connected with the output end of the m-th first data transmission path, the output end of the n-th second data transmission path, and the first detection unit, and is configured to conduct the output end of the m-th first data transmission path with the output end of the n-th second data transmission path according to the first detection signal.

In some embodiments of the present disclosure, the first data driver chip further comprises a second output control module connected with two of the first data transmission paths, and the second output control module is configured to conduct output ends of the two connected first data transmission paths when input voltages of the two connected first data transmission paths are same.

In some embodiments of the present disclosure, the second data driver chip further comprises a third output control module connected with two of the second data transmission paths, and the third output control module is configured to conduct output ends of the two connected second data transmission paths when input voltages of the two connected second data transmission paths are same.

The present disclosure provides a driver device and a display device. In the driver device, a first output control module is disposed between two adjacent data driver chips, the first output control module detects input voltages of two adjacent data transmission paths respectively located in the two adjacent data driver chips. When the input voltages of the two adjacent data transmission paths respectively located in the two adjacent data driver chips are same, the first output control module conducts output ends of the two adjacent data transmission paths, which ensures that output voltages of the two adjacent data transmission paths respectively located in the two adjacent data driver chips are same, thereby effectively solving a problem of split screens caused by a charging difference between two adjacent data driver chips.

BRIEF DESCRIPTION OF DRAWINGS

In order to more clearly illustrate the technical solution in the embodiment of the present disclosure, the following will be a brief introduction to the drawings required in the description of the embodiment. Obviously, the drawings described below are only some embodiments of the present disclosure, for those skilled in the art, without the premise of creative labor, may also obtain other drawings according to these drawings.

DETAILED DESCRIPTION OF THE EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

The term “first”, “second” are for illustrative purposes only and are not to be construed as indicating or imposing a relative importance or implicitly indicating the number of technical features indicated. Thus, a feature that limited by “first”, “second” may expressly or implicitly include at least one of the features. In the description of the present disclosure, the meaning of “plural” is two or more, unless otherwise specifically defined.

Figure 1:
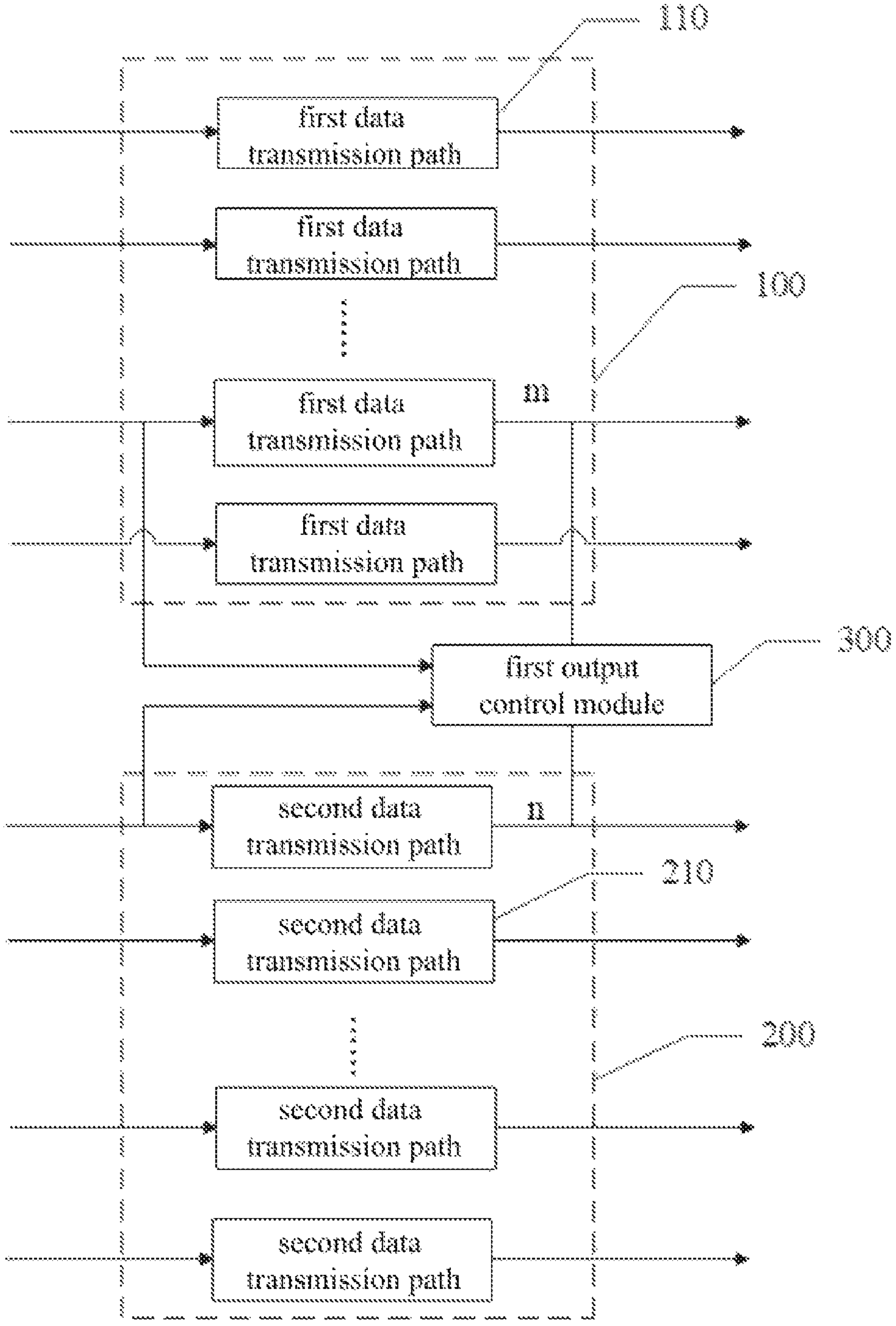
FIG. 1 is a schematic diagram of a first structure of a driver device according to an embodiment of the present disclosure.

Please refer to FIG. 1, the present disclosure provides a driver device that comprises a first data driver chip 100, a second data driver chip 200, and a first output control module 300. The first data driver chip 100 and the second data driving chip 200 are disposed adjacent to each other. The first data driver chip 100 comprises a plurality of first data transmission paths 110. The second data driver chip 200 comprises a plurality of second data transmission paths 210. The first output control module 300 is connected with the m-th first data transmission path 110 and the n-th second data transmission path 210, and m and n are positive integers. Specifically, the first output control module 300 is connected with an input end and an output end of the m-th first data transmission path 110, and the first output control module 300 is connected with an input end and an output end of the n-th second data transmission path 210. The m-th first data transmission path 110 is located in the first data driver chip 100 close to the second data driver chip 200, or the n-th second data transmission path 210 is located in the second data driver chip 200 close to the first data driver chip 100. That is, the m-th first data transmission path 110 is close to the second data driver chip 200, and the n-th second data transmission path 210 is close to the first data driver chip 100.

The first output control module 300 is configured to conduct the output end of the m-th first data transmission path 110 with the output end of the n-th second data transmission path 210 when an input voltage of the m-th first data transmission path 110 is same as an input voltage of the n-th second data transmission path 210. In the present disclosure, the first output control module 300 is disposed between two adjacent data driver chips, the first output control module 300 detects input voltages of two adjacent data transmission paths respectively located in the two adjacent data driver chips. When the input voltages of the two adjacent data transmission paths respectively located in the two adjacent data driver chips are same, the first output control module 300 conducts output ends of the two adjacent data transmission paths, so that the output ends of the two adjacent data transmission paths are connected in parallel. This ensures that output voltages of the two adjacent data transmission paths respectively located in the two adjacent data driver chips are same, thereby effectively solving a problem of split screens caused by a charging difference between two adjacent data driver chips.

In this embodiment, the first output control module 300 is disposed outside the first data driver chip 100 and the second data driver chip 200. In another embodiment, the first output control module 300 is integrally disposed inside the first data driver chip 100 or the second data driver chip 200, which may be disposed according to actual needs, and is not limited in the present disclosure.

A polarity of the input voltage of the m-th first data transmission path 110 is same as a polarity of the input voltage of the n-th second data transmission path 210. For example, the input voltage of the m-th first data transmission path 110 and the input voltage of the n-th second data transmission path 210 are both positive polarity voltages or both negative polarity voltages. Then, when voltage values of the input voltages of the m-th first data transmission path 110 and the n-th second data transmission path 210 are same, in order to ensure that the output voltages of the m-th first data transmission path 110 and the n-th second data transmission path 210 are also same, the output ends of the m-th first data transmission path 110 and the n-th second data transmission path 210 are conducted. This ensures that output voltages of the two adjacent data transmission paths respectively located in the two adjacent data driver chips are same, thereby effectively solving a problem of split screens caused by a charging difference between two adjacent data driver chips.

Figure 2:
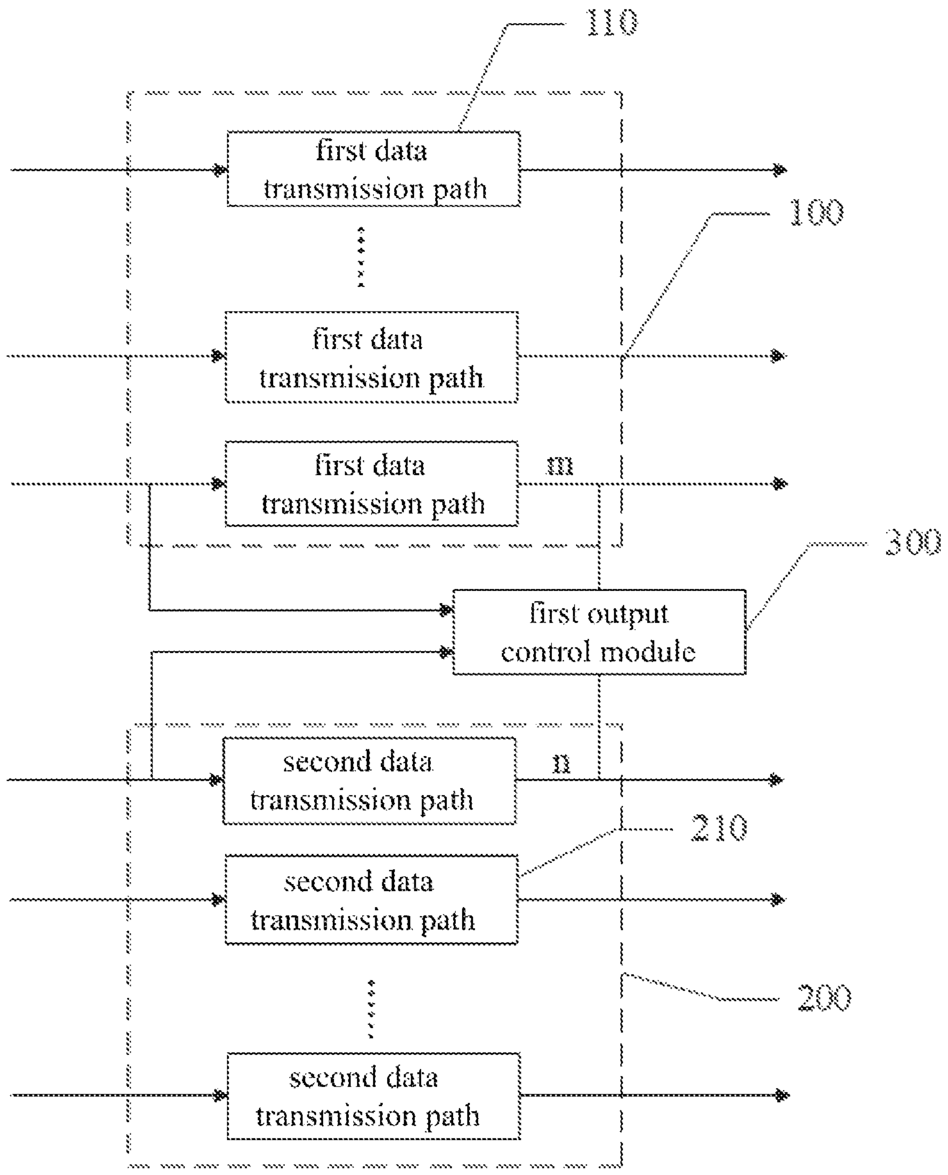
FIG. 2 is a schematic diagram of a second structure of the driver device according to an embodiment of the present disclosure.

If there are positive and negative input voltages, a number of the first output control modules 300 is two. One of the first output control modules 300 detects two adjacent data transmission paths with the positive input voltages respectively located in the two adjacent data driver chips, and the other one of the first output control modules 300 detects two adjacent data transmission paths with the negative input voltages respectively located in the two adjacent data driver chips As shown in FIG. 2, the m-th first data transmission path 110 and the n-th second data transmission path 210 are two adjacent data transmission paths. When the m-th first data transmission path 110 and the n-th second data transmission path 210 are adjacent to each other, and output voltages polarities of the m-th first data transmission path 110 and the n-th second data transmission path 210 are same, the first data transmission paths 110 with a same input voltage polarity are disposed adjacent to each other in the first data driver chip 100, and the second data transmission paths 210 with a same input voltage polarity are disposed adjacent to each other in the second data driver chip 200.

As shown in FIG. 1, the m-th first data transmission path 110 and the n-th second data transmission path 210 are two adjacent odd-numbered or even-numbered data transmission paths. When the m-th first data transmission path 110 and the n-th second data transmission path 210 are adjacent to each other, and output voltages polarities of the m-th first data transmission path 110 and the n-th second data transmission path 210 are same, the first data transmission paths 110 with the same input voltage polarity are disposed at intervals in the first data driver chip 100, and the second data transmission paths 210 with the same input voltage polarity are disposed at intervals in the second data driver chip 200.

In the following embodiments, the driver device is described by taking the data transmission paths with the same input voltage polarity disposed at intervals in each data driving chip as an example.

Figure 3:
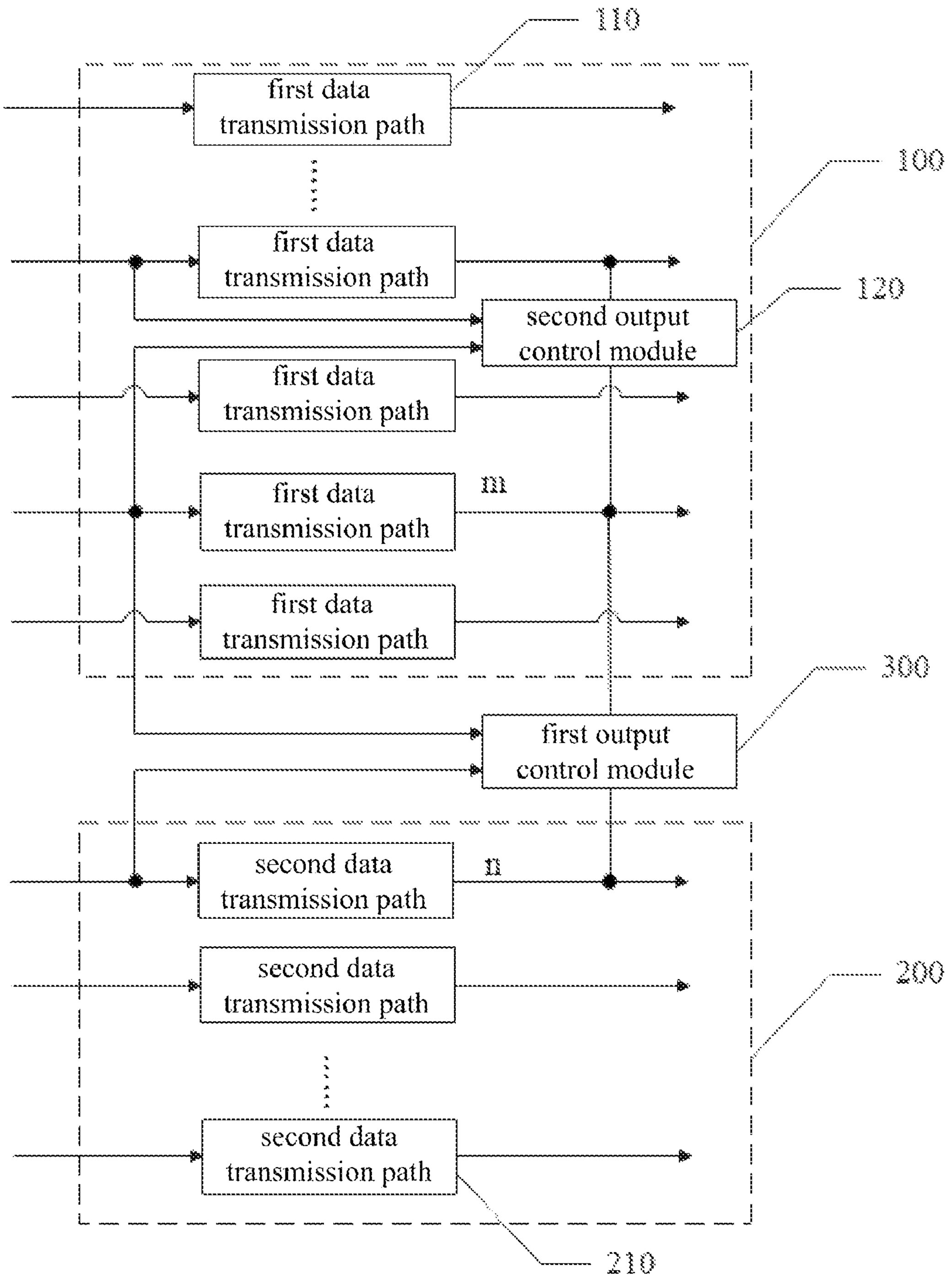
FIG. 3 is a schematic structural diagram of a second output control module in the driver device according to an embodiment of the present disclosure.

Please refer to FIG. 3, the first data driver chip 100 further comprises a second output control module 120. The second output control module 120 is connected with two first data transmission paths 110. The second output control module 120 is configured to conduct output ends of the two first data transmission paths 110 when input voltages of the two first data transmission paths 110 are same. Similarly, in this embodiment, polarities of the input voltages of the two first data transmission paths 110 connected by the second output control module 120 are same.

When the second output control module 120 is disposed inside the first data driver chip 100, the second output control module 120 controls conduction of the output ends of the two first data transmission paths 110 with the same input voltage inside the first data driver chip 100 to ensure that the output voltages of the two first data transmission paths 110 are the same.

One of the two first data transmission paths 110 connected by the second output control module 120 is the m-th first data transmission path 110. If one of the first data transmission paths 110 in the first data driver chip 100 has a same input voltage as the input voltage of the m-th first data transmission path 110, the second output control module 120 conducts the output end of the first data transmission path 110 with the output end of the m-th first data transmission path 110. At this time, the output voltages of the first data transmission path 110, the m-th first data transmission path 110, and the n-th second data transmission path 210 are all the same, thereby avoiding split screens caused by insufficient charging due to excessive load.

Figure 4:
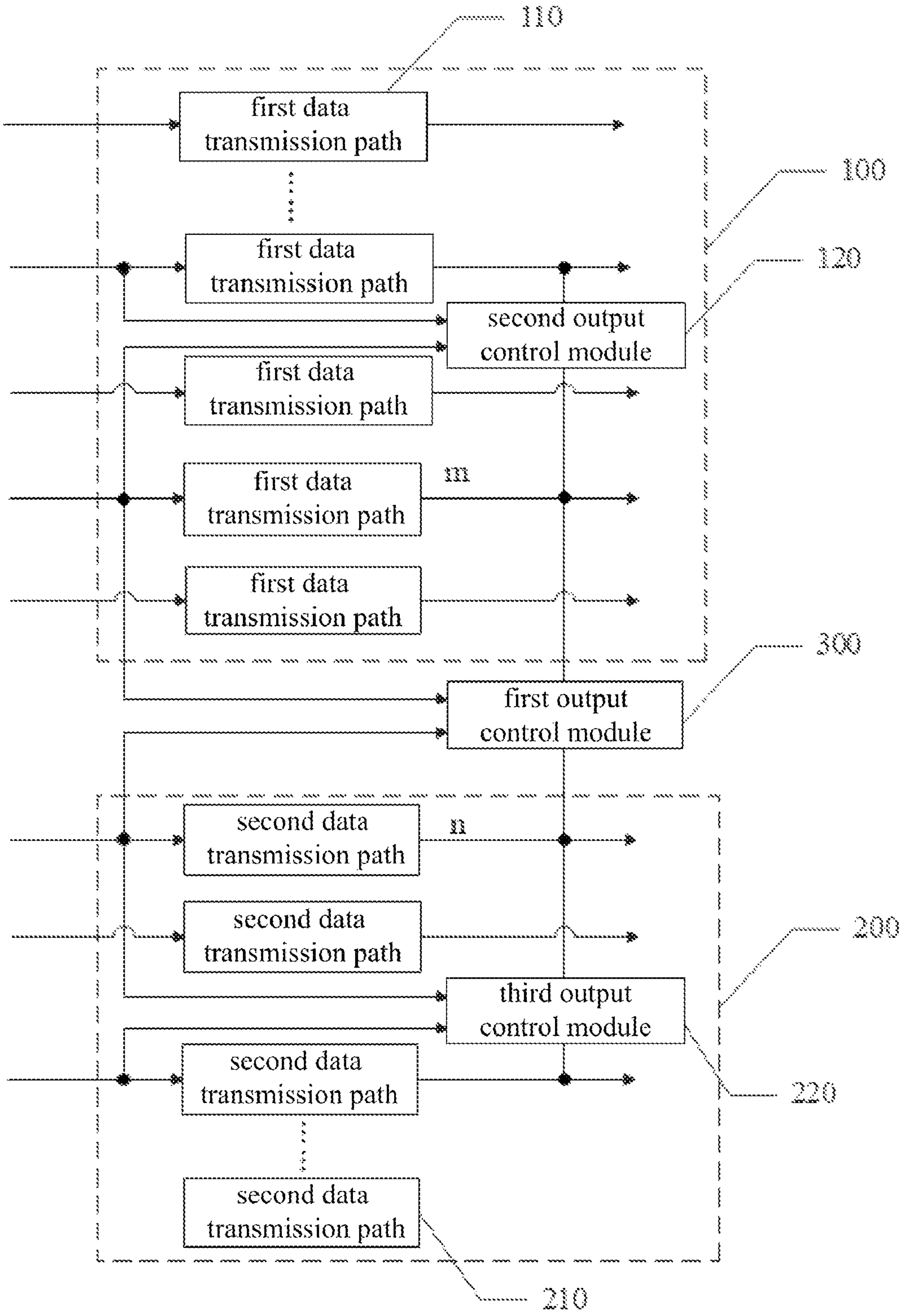
FIG. 4 is a schematic structural diagram of a third output control module in the driver device according to an embodiment of the present disclosure.

Please refer to FIG. 4, the second data driver chip 200 further comprises a third output control module 220. The third output control module 220 is connected with two second data transmission paths 210. The third output control module 220 is configured to conduct output ends of the two second data transmission paths 210 when input voltages of the two second data transmission paths 210 are same. Similarly, in this embodiment, polarities of the input voltages of the two second data transmission paths 210 connected by the third output control module 220 are same.

When the third output control module 220 is disposed inside the second data driver chip 200, the third output control module 220 controls conduction of the output ends of the two second data transmission paths 210 with the same input voltage inside the second data driver chip 200 to ensure that the output voltages of the two second data transmission paths 210 are the same.

One of the two second data transmission paths 210 connected by the third output control module 220 is the n-th second data transmission path 210. If one of the second data transmission paths 210 in the second data driver chip 200 has a same input voltage as the input voltage of the n-th second data transmission path 210, the third output control module 220 conducts the output end of the second data transmission path 210 with the output end of the n-th second data transmission path 210. At this time, the output voltages of the second data transmission path 210, the m-th first data transmission path 110, and the n-th second data transmission path 210 are all the same, thereby avoiding split screens caused by insufficient charging due to excessive load.

Figure 5:
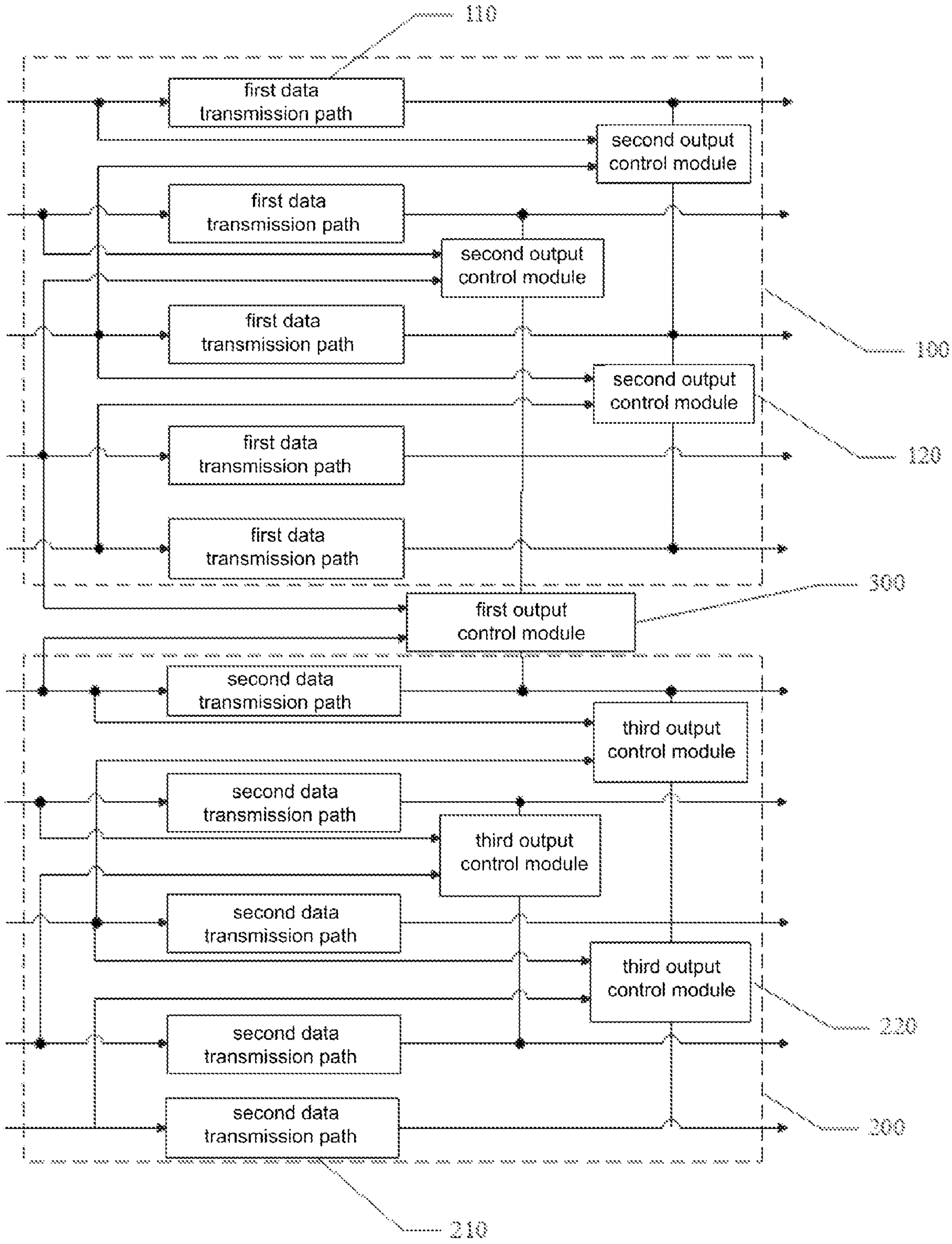
FIG. 5 is a schematic structural diagram of a plurality of the second output control modules and a plurality of the third output control modules in the driver device according to an embodiment of the present disclosure.

When a number of the first data transmission paths 110 in the first data driver chip 100 is a, a number of the second output control module 120 may be (a-2), wherein a is a positive integer greater than 2. As shown in FIG. 5, for example, a is 5, and the number of the second output control module 120 is 3. Specifically, every two first data transmission paths 110 are connected to one second output control module 120. If the first data transmission paths 110 with the same input voltage polarity are disposed adjacently, the 1st first data transmission path 110 and the 2nd first data transmission path 110 are connected to the 1st second output control module 120, and the 2nd first data transmission path 110 and the 3rd first data transmission path 110 are connected to the 2nd second output control module 120, and so on. The number of the first data transmission paths 110 with the same input voltage polarity is one more than the number of the second output control modules 120. If there are first data transmission paths 110 with positive and negative input voltage polarities, a total number of the second output control modules 120 is two less than the number of the first data transmission paths 110. In this embodiment, each of the first data transmission paths 110 is connected to one of the second output control modules 120. If some of the first data transmission paths 110 inside the first data driver chip 100 have the same input voltage, the output ends of the first data transmission paths 110 are conducted to ensure that the first data transmission paths 110 with the same input voltage have a same output voltage, thereby avoiding split screens on the display device.

When a number of the second data transmission paths 210 in the second data driver chip 200 is b, a number of the third output control module 220 may be (b-2), wherein b is a positive integer greater than 2. As shown in FIG. 5, for example, b is 5, and the number of the third output control modules 220 is 3. Specifically, every two second data transmission paths 210 are connected to one third output control module 220. If the second data transmission paths 210 with the same input voltage polarity are disposed adjacently, the 1st second data transmission path 210 and the 2nd second data transmission path 210 are connected to the 1st third output control module 220, and the 2nd second data transmission path 210 and the 3rd second data transmission path 210 are connected to the 2nd third output control module 220, and so on. The number of the second data transmission paths 210 with the same input voltage polarity is one more than the number of the third output control modules 220. If there are second data transmission paths 210 with positive and negative input voltage polarities, a total number of the third output control modules 220 is two less than the number of the second data transmission paths 210. In this embodiment, each of the second data transmission paths 210 is connected to one of the third output control modules 220. If some of the second data transmission paths 210 inside the second data driver chip 200 have the same input voltage, the output ends of the second data transmission paths 210 are conducted to ensure that the second data transmission paths 210 with the same input voltage have a same output voltage, thereby avoiding split screens on the display device.

Figure 6:
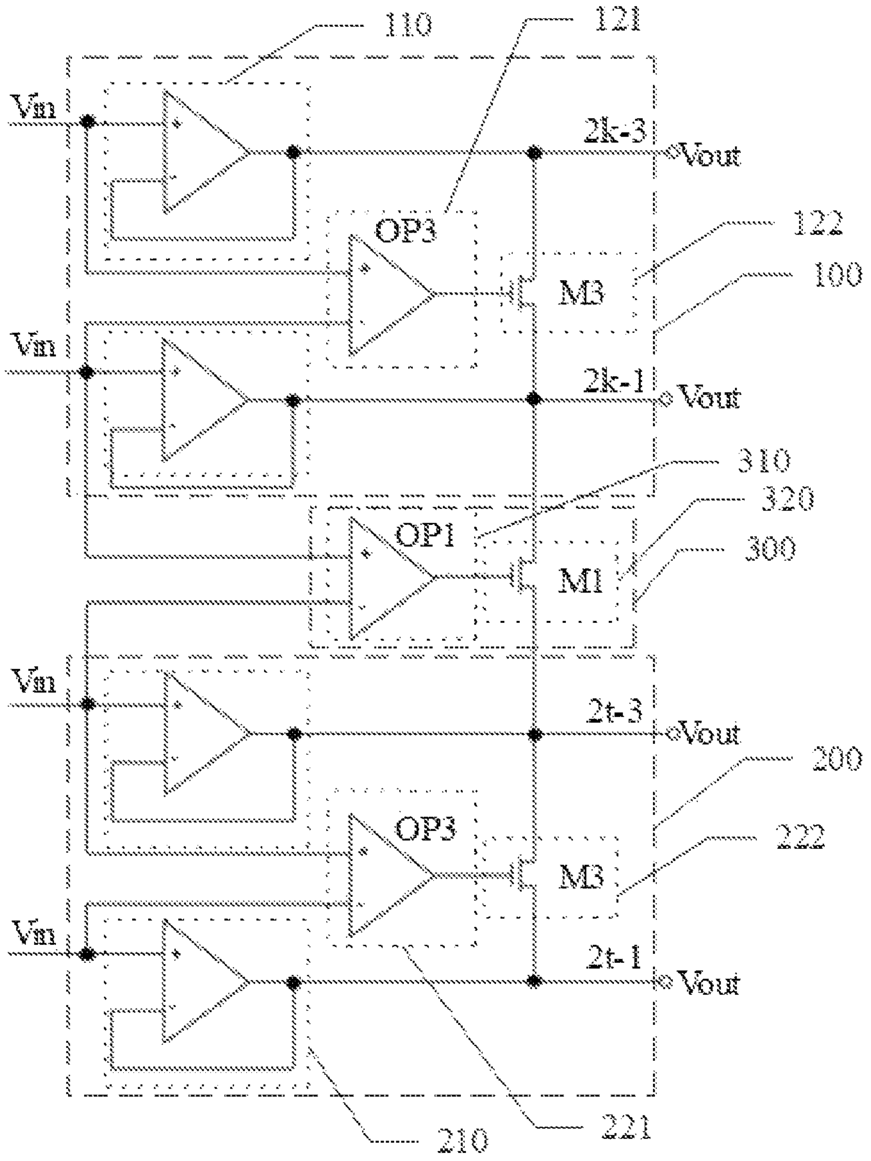
FIG. 6 is a circuit structure diagram of a first output control module, the second output control, and the third output control module in the driver device according to an embodiment of the present disclosure.

Please refer to FIG. 6, the first output control module 300 comprises a first detection unit 310 and a first control unit 320. The first detection unit 310 is connected with the input end of the m-th first data transmission path 110 and the input end of the n-th second data transmission path 210. The first control unit 320 is connected with the output end of the m-th first data transmission path 110, the output end of the n-th second data transmission path 210, and the first detection unit 310. In FIG. 6, 2k-3 and 2k-1 represent two adjacent odd-numbered first data transmission paths 110 in the first data driver chip 100, and k is a positive integer greater than 1. 2t-3 and 2t-1 represent two adjacent even-numbered second data transmission paths 210 in the second data driver chip 200, and t is a positive integer greater than 1. In this embodiment, the m-th first data transmission path 110 connected to the first detection unit 310 is an odd-numbered first data transmission path 110, and the n-th second data transmission path 210 connected to the first detection unit 310 is an odd-numbered second data transmission path 210.

The first detection unit 310 is configured to output a first detection signal when the input voltage of the m-th first data transmission path 110 is the same as the input voltage of the n-th second data transmission path 210. The first control unit 320 is configured to conduct the output end of the m-th first data transmission path 110 with the output end of the n-th second data transmission path 210 according to the first detection signal. On contrary, if the input voltage of the m-th first data transmission path 110 is not the same as the input voltage of the n-th second data transmission path 210, the first control unit 320 is not activated, and thus the output end of the m-th first data transmission path 110 and the output end of the n-th second data transmission path 210 are independent of each other.

The second output control module 120 comprises a second detection unit 121 and a second control unit 122. The second detection unit 121 is connected with input ends of two first data transmission paths 110. The second control unit 122 is connected with output ends of the two first data transmission paths 110 connected by the second detection unit 121, and is connected by the second detection unit 121. The second detection unit 121 is configured to output a second detection signal when input voltages of the two first data transmission paths 110 are same. The second control unit 122 is configured to control conduction of the output ends of the two first data transmission paths 110 connected by the second detection unit 121 according to the second detection signal. If the input voltages of the two first data transmission paths 110 are not the same, the second control unit 122 is not activated, and the output ends of the two first data transmission paths 110 are independent of each other.

The third output control module 220 comprises a third detection unit 221 and a third control unit 222. The third detection unit 221 is connected with input ends of two second data transmission paths 210. The third control unit 222 is connected with the output ends of the two first data transmission paths 110 connected by the third detection unit 221, and is connected by the third detection unit 221. The third detection unit 221 is configured to output a third detection signal when input voltages of the two second data transmission paths 210 are same. The third control unit 222 is configured to control conduction of the output ends of the two second data transmission paths 210 connected by the third detection unit 221 according to the third detection signal. On contrary, if the input voltages of the two second data transmission paths 210 are not the same, the third control unit 222 is not activated, and the output ends of the two second data transmission paths 210 are independent of each other.

Please refer to FIG. 6, taking the first output control module 300, the second output control module 120, and the third output control module 220 connected to adjacent odd-numbered data transmission paths as an example, a structure of each module is specifically described. In a specific embodiment, the first detection unit 310 comprises a first comparator OP1, and the first control unit 320 comprises a first switching transistor M1. A non-inverting input end of the first comparator OP1 is connected with the input end of the m-th first data transmission path 110. An inverting input end of the first comparator OP1 is connected with the input end of the n-th second data transmission path 210. An output end of the first comparator OP1 is connected with a first end of the first switching transistor M1. A second end of the first switching transistor M1 is connected with the output end of the m-th first data transmission path 110. A third end of the first switching transistor M1 is connected with the output end of the n-th second data transmission path 210.

The first comparator OP1 is configured to compare the input voltage of the m-th first data transmission path 110 with the input voltage of the n-th second data transmission path 210. If the first comparator OP1 determines that the input voltages of the two data transmission paths are same, the first comparator OP1 outputs the first detection signal to the first switching transistor M1 to control the first switching transistor M1 to turn on. The first detection signal is a high-level signal or a low-level signal, which is specifically set according to a type of the first switching transistor M1. After the first switching transistor M1 is turned on, the output end of the m-th first data transmission path 110 and the output end of the n-th second data transmission path 210 are conducted. When the first comparator OP1 determines that the input voltages of the two data transmission paths are not the same, the first comparator OP1 controls the first switching transistor M1 to turn off, so the output end of the m-th first data transmission path 110 and the output end of the n-th second data transmission path 210 are independent of each other.

The second detection unit 121 comprises a second comparator OP2, and the second control unit 122 comprises a second switching transistor M2. A non-inverting input end of the second comparator OP2 is connected with the input end of one of the first data transmission paths 110. An inverting input end of the second comparator OP2 is connected with the input end of another first data transmission path 110. An output end of the second comparator OP2 is connected with a first end of the second switching transistor M2. A second end of the second switching transistor M2 is connected with the output end of the one of the first data transmission paths 110. A third end of the second switching transistor M2 is connected with the output end of the another first data transmission path 110.

In this embodiment, the second comparator OP2 is configured to compare the input voltages of the two connected first data transmission paths 110. If the second comparator OP2 determines that the input voltages of the two data transmission paths are same, the second comparator OP2 outputs the second detection signal to the second switching transistor M2 to control the second switching transistor M2 to turn on. The second detection signal is a high-level signal or a low-level signal, which is specifically set according to a type of the second switching transistor M2. After the second switching transistor M2 is turned on, the output ends of the two first data transmission paths 110 are conducted. When the second comparator OP2 determines that the input voltages of the two data transmission paths are not the same, the second comparator OP2 controls the second switching transistor M2 to turn off, so the output ends of the two first data transmission paths 110 are independent of each other.

The third detection unit 221 comprises a third comparator OP3, and the third control unit 222 comprises a third switching transistor M3. A non-inverting input end of the third comparator OP3 is connected with the input end of one of the second data transmission paths 210. An inverting input end of the third comparator OP3 is connected with the input end of another second data transmission path 210. An output end of the third comparator OP3 is connected with a first end of the third switching transistor M3. A second end of the third switching transistor M3 is connected with the output end of the one of the second data transmission paths 210. A third end of the third switching transistor M3 is connected with the output end of the another second data transmission path 210.

In this embodiment, the third comparator OP3 is configured to compare the input voltages of the two connected second data transmission paths 210. If the third comparator OP3 determines that the input voltages of the two data transmission paths are same, the third comparator OP3 outputs the third detection signal to the third switching transistor M3 to control the third switching transistor M3 to turn on. The third detection signal is a high-level signal or a low-level signal, which is specifically set according to a type of the third switching transistor M3. After the third switching transistor M3 is turned on, the output ends of the two second data transmission paths 210 are conducted. When the third comparator OP3 determines that the input voltages of the two data transmission paths are not the same, the third comparator OP3 controls the third switching transistor M3 to turn off, so the output ends of the two second data transmission paths 210 are independent of each other.

The first switching transistor M1, the second switching transistor M2 and the third switching transistor M3 are MOS transistors. The first end of each switching transistor is a gate of the MOS transistor, the second end of each switching transistor is one of a drain or a source of the MOS transistor, and the third end of each switching transistor is the other one of the drain or the source of the MOS transistor.

Figure 7:
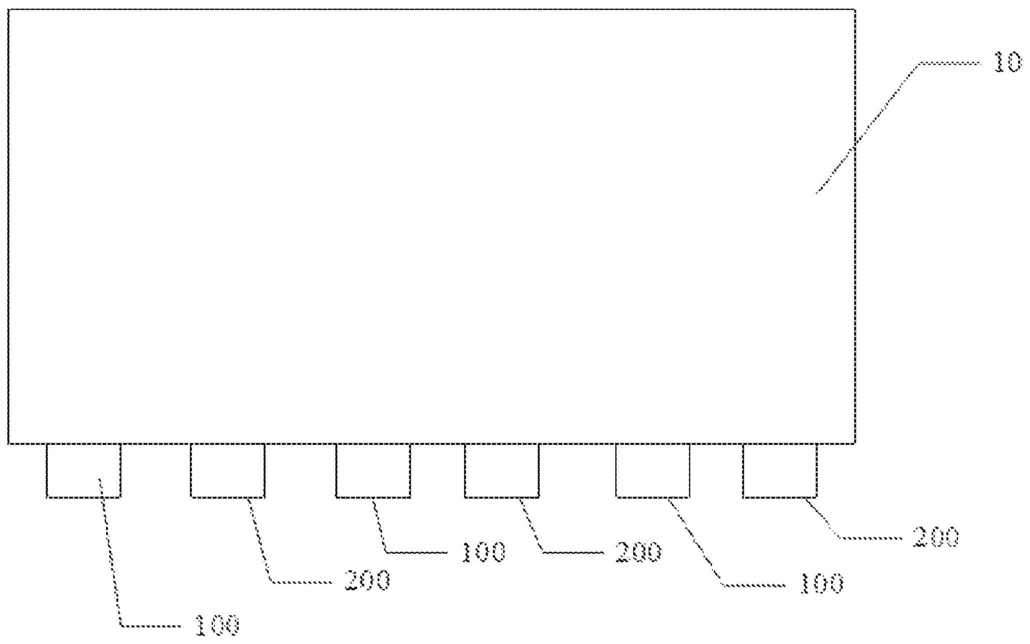
FIG. 7 is a structural block diagram of a display device according to an embodiment of the present disclosure.

Please refer to FIG. 7, the present disclosure further provides a display device, which comprises a display panel 10 and the aforementioned driver device. In this embodiment, the driver device is provided with a plurality of the first data driver chips 100 and a plurality of the second data driver chips 200. The first data driver chips 100 and the second data driver chips 200 in the driver device are all connected with the display panel 10. The first data driver chips 100 and the second data driver chips 200 provide data voltages to the display panel 10 to drive the display panel 10 to display corresponding images.

The present disclosure provides a driver device. In the driver device, a first output control module is disposed between two adjacent first data driver chip 100 and second data driver chip 200, the first output control module detects input voltages of two adjacent data transmission paths respectively located in the two adjacent data driver chips. When the input voltages of the two adjacent data transmission paths respectively located in the two adjacent data driver chips are same, the first output control module conducts output ends of the two adjacent data transmission paths, which ensures that output voltages of the two adjacent data transmission paths respectively located in the two adjacent data driver chips are same, thereby effectively solving a problem of split screens caused by a charging difference between two adjacent data driver chips.

In the above embodiments, each embodiment is described with its own emphasis. For parts that are not described in detail in a certain embodiment, please refer to the relevant descriptions of other embodiments.

The above is a driver device and display device provided by embodiments of the present disclosure is described in detail, and a specific example is applied herein to explain the principle and embodiment of the present disclosure, and the description of the above embodiment is only used to help understand the method of the present disclosure and its core ideas. At the same time, for those skilled in the art, according to the idea of the present disclosure, there will be changes in the specific embodiment and the scope of application, in summary, the content of this specification should not be understood as a restriction on the present disclosure.

What is claimed is:

1. A driver device, comprising:

a first data driver chip comprising a plurality of first data transmission paths;

a second data driver chip disposed adjacent to the first data driver chip and comprising a plurality of second data transmission paths; and a first output control driver connected with the m-th first data transmission path and the n-th second data transmission path, and configured to conduct an output end of the m-th first data transmission path with an output end of the n-th second data transmission path when an input voltage of the m-th first data transmission path is same as an input voltage of the n-th second data transmission path, where m and n are positive integers, and the m-th first data transmission path is close to the second data driver chip, or the n-th second data transmission path is close to the first data driver chip.

2. The driver device according to claim 1, wherein the m-th first data transmission path and the n-th second data transmission path are two adjacent data transmission paths.

3. The driver device according to claim 2, wherein a polarity of the input voltage of the m-th first data transmission path is same as a polarity of the input voltage of the n-th second data transmission path.

4. The driver device according to claim 1, wherein the m-th first data transmission path and the n-th second data transmission path are two adjacent odd-numbered or even-numbered data transmission paths.

5. The driver device according to claim 1, wherein the first output control driver comprises:

a first detection driver, connected with an input end of the m-th first data transmission path and an input end of the n-th second data transmission path, and configured to output a first detection signal when the input voltage of the m-th first data transmission path is the same as the input voltage of the n-th second data transmission path; and a first control driver, connected with the output end of the m-th first data transmission path, the output end of the n-th second data transmission path, and the first detection driver, and configured to conduct the output end of the m-th first data transmission path with the output end of the n-th second data transmission path according to the first detection signal.

6. The driver device according to claim 5, wherein the first detection driver comprises a first comparator, the first control driver driver comprises a first switching transistor, a non-inverting input end of the first comparator is connected with the input end of the m-th first data transmission path, an inverting input end of the first comparator is connected with the input end of the n-th second data transmission path, an output end of the first comparator is connected with a first end of the first switching transistor, a second end of the first switching transistor is connected with the output end of the m-th first data transmission path, and a third end of the first switching transistor is connected with the output end of the n-th second data transmission path.

7. The driver device according to claim 1, wherein the first data driver chip further comprises a second output control driver connected with two of the first data transmission paths, and the second output control driver is configured to conduct output ends of the two connected first data transmission paths when input voltages of the two connected first data transmission paths are same.

8. The driver device according to claim 7, wherein one of the two first data transmission paths connected by the second output control driver is the m-th first data transmission path.

9. The driver device according to claim 7, wherein a number of the first data transmission paths in the first data driver chip is a, a is a positive integer greater than 2, a number of the second output control driver is (a-2), every two first data transmission paths are connected to one second output control driver, and the second output control driver is configured to conduct the output ends of the two connected first data transmission paths when the input voltages of the two connected first data transmission paths are same.

10. The driver device according to claim 7, wherein the second output control driver comprises:

a second detection driver, connected with input ends of two of the first data transmission paths, and configured to output a second detection signal when the input voltages of the two connected first data transmission paths are same; and a second control driver, connected with the output ends of the two first data transmission paths connected by the second detection driver, connected with the second detection driver, and configured to control conduction of the output ends of the two first data transmission paths connected by the second detection driver according to the second detection signal.

11. The driver device according to claim 10, wherein the second detection driver comprises a second comparator, the second control driver comprises a second switching transistor, a non-inverting input end of the second comparator is connected with the input end of one of the first data transmission paths, an inverting input end of the second comparator is connected with the input end of another first data transmission path, an output end of the second comparator is connected with a first end of the second switching transistor, a second end of the second switching transistor is connected with the output end of the one of the first data transmission paths, and a third end of the second switching transistor is connected with the output end of the another first data transmission path.

12. The driver device according to claim 1, wherein the second data driver chip further comprises a third output control driver connected with two of the second data transmission paths, and the third output control driver is configured to conduct output ends of the two connected second data transmission paths when input voltages of the two connected second data transmission paths are same.

13. The driver device according to claim 12, wherein one of the two second data transmission paths connected by the third output control driver is the n-th first data transmission path.

14. The driver device according to claim 12, wherein a number of the second data transmission paths in the second data driver chip is b, b is a positive integer greater than 2, a number of the third output control driver is (b-2), every two second data transmission paths are connected to one third output control driver, and the third output control driver is configured to conduct the output ends of the two connected second data transmission paths when the input voltages of the two connected second data transmission paths are same.

15. The driver device according to claim 12, wherein the third output control driver comprises:

a third detection driver, connected with input ends of two of the second data transmission paths, and configured to output a third detection signal when the input voltages of the two connected second data transmission paths are the same; and a third control driver, connected with the output ends of the two second data transmission paths connected by the third detection driver, connected with the third detection driver, and configured to control conduction of the output ends of the two second data transmission paths connected by the third detection driver according to the third detection signal.

16. The driver device according to claim 15, wherein the third detection driver comprises a third comparator, the third control driver comprises a third switching transistor, a non-inverting input end of the third comparator is connected with the input end of one of the second data transmission paths, an inverting input end of the third comparator is connected with the input end of another second data transmission path, an output end of the third comparator is connected with a first end of the third switching transistor, a second end of the third switching transistor is connected with the output end of the one of the second data transmission paths, and a third end of the third switching transistor is connected with the output end of the another second data transmission path.

17. A display device, comprising:

a display panel; and a driver device, coupled to the display panel and configured to provide a data voltage to the display panel, the driver panel comprising:

a first data driver chip comprising a plurality of first data transmission paths;

a second data driver chip disposed adjacent to the first data driver chip and comprising a plurality of second data transmission paths; and a first output control driver connected with the m-th first data transmission path and the n-th second data transmission path, and configured to conduct an output end of the m-th first data transmission path with an output end of the n-th second data transmission path when an input voltage of the m-th first data transmission path is same as an input voltage of the n-th second data transmission path, where m and n are positive integers, and the m-th first data transmission path is close to the second data driver chip, or the n-th second data transmission path is close to the first data driver chip.

18. The display device according to claim 17, wherein the first output control driver comprises:

a first detection driver, connected with an input end of the m-th first data transmission path and an input end of the n-th second data transmission path, and configured to output a first detection signal when the input voltage of the m-th first data transmission path is the same as the input voltage of the n-th second data transmission path; and a first control driver, connected with the output end of the m-th first data transmission path, the output end of the n-th second data transmission path, and the first detection driver, and configured to conduct the output end of the m-th first data transmission path with the output end of the n-th second data transmission path according to the first detection signal.

19. The display device according to claim 17, wherein the first data driver chip further comprises a second output control driver connected with two of the first data transmission paths, and the second output control driver is configured to conduct output ends of the two connected first data transmission paths when input voltages of the two connected first data transmission paths are same.

20. The display device according to claim 17, wherein the second data driver chip further comprises a third output control driver connected with two of the second data transmission paths, and the third output control driver is configured to conduct output ends of the two connected second data transmission paths when input voltages of the two connected second data transmission paths are same.

* * * * *